US009152170B2

(12) United States Patent
Zhu

(10) Patent No.: US 9,152,170 B2
(45) Date of Patent: Oct. 6, 2015

(54) ROTATION MODULE WITH LINKED PLUGGING AND UNPLUGGING DESIGN

(71) Applicant: Wistron Corporation, New Taipei (TW)

(72) Inventor: Chong-Xing Zhu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 134 days.

(21) Appl. No.: 14/172,961

(22) Filed: Feb. 5, 2014

(65) Prior Publication Data
US 2015/0062795 A1 Mar. 5, 2015

(30) Foreign Application Priority Data
Sep. 5, 2013 (CN) .......................... 2013 1 0400494

(51) Int. Cl.
G06F 1/16 (2006.01)
H05K 5/00 (2006.01)
H05K 7/00 (2006.01)

(52) U.S. Cl.
CPC ...................................... *G06F 1/16* (2013.01)

(58) Field of Classification Search
CPC ................. G06F 1/16; G06F 1/1601–1/1611; G06F 1/1613–1/1698; G06F 1/18–1/189; H05K 5/00–5/069; H05K 7/00–7/186
USPC ......... 361/756, 741, 686, 687, 688, 696, 697, 361/787, 789, 794, 701–703, 709, 807–810, 361/679.01–679.45, 679.55–679.61, 361/724–727; 312/223.1–223.3; 349/56–60; 455/575.1–575.9; 348/787, 348/789, 794
See application file for complete search history.

(56) References Cited

U.S. PATENT DOCUMENTS

| | | | | |
|---|---|---|---|---|
| 5,477,415 | A | * 12/1995 | Mitcham et al. | 361/679.42 |
| 5,619,398 | A | * 4/1997 | Harrison et al. | 361/679.43 |
| 6,101,097 | A | * 8/2000 | Foo et al. | 361/727 |
| 6,404,626 | B1 | * 6/2002 | Low et al. | 361/679.41 |
| 7,414,854 | B1 | * 8/2008 | Douglas | 361/752 |
| 8,259,441 | B2 | 9/2012 | Chuang | |
| 2002/0118514 | A1 | * 8/2002 | Coglitore et al. | 361/724 |
| 2003/0103325 | A1 | * 6/2003 | Resnick | 361/683 |
| 2004/0125557 | A1 | * 7/2004 | Rahmouni et al. | 361/686 |
| 2005/0047104 | A1 | * 3/2005 | Grunow et al. | 361/801 |
| 2005/0111178 | A1 | * 5/2005 | Bradley et al. | 361/684 |
| 2006/0133030 | A1 | * 6/2006 | Takahashi et al. | 361/685 |
| 2006/0171109 | A1 | * 8/2006 | Chang | 361/685 |
| 2007/0258201 | A1 | * 11/2007 | Keller et al. | 361/683 |
| 2008/0094810 | A1 | * 4/2008 | Lajara et al. | 361/759 |

(Continued)

*Primary Examiner* — Anthony Haughton
*Assistant Examiner* — Razmeen Gafur
(74) *Attorney, Agent, or Firm* — McClure, Qualey & Rodack, LLP

(57) ABSTRACT

A rotation module with a linked plugging and unplugging design is applied to a host case for installation and disassembly. The rotation module includes: a housing, for accommodating a data storage unit electrically connected to a cable; a placement assembly, for guiding the housing along a first direction to install or disassemble the housing; a rotation assembly, for rotatably combining the housing and the placement assembly so that the housing is capable of rotating along a second direction; and a linkage assembly, having a first end and a second end, with a plug assembly of the cable assembled to the second end. In response to the housing rotated along the second direction, the second end of the linkage assembly moves in a linked manner along the first direction and enables the plug assembly to plug into or unplug from a slot of a motherboard.

14 Claims, 17 Drawing Sheets

(56) References Cited

U.S. PATENT DOCUMENTS

| | | | |
|---|---|---|---|
| 2009/0067126 A1* | 3/2009 | Kunz | 361/679.32 |
| 2011/0228473 A1* | 9/2011 | Anderson et al. | 361/679.58 |
| 2011/0261526 A1* | 10/2011 | Atkins et al. | 361/679.33 |
| 2011/0299260 A1* | 12/2011 | Tang et al. | 361/807 |
| 2012/0050977 A1* | 3/2012 | Lai | 361/679.33 |
| 2012/0050978 A1* | 3/2012 | Lai | 361/679.33 |
| 2012/0050981 A1* | 3/2012 | Xu et al. | 361/679.33 |
| 2012/0134101 A1* | 5/2012 | Zhang | 361/679.39 |
| 2013/0107454 A1* | 5/2013 | Wilke et al. | 361/694 |
| 2013/0252447 A1* | 9/2013 | Mau et al. | 439/160 |
| 2013/0290591 A1* | 10/2013 | Schwarzkopf et al. | 710/303 |

* cited by examiner

ROTATION MODULE WITH LINKED PLUGGING AND UNPLUGGING DESIGN

This application claims the benefit of People's Republic of China application Serial No. 201310400494.8, filed Sep. 5, 2013, the subject matter of which is incorporated herein by reference.

BACKGROUND OF THE INVENTION

1. Field of the Invention

The invention relates in general to a rotation module with a linked plugging and unplugging design, and more particularly to a rotation module, which is applied to a host case and is capable of simultaneously plugging/unplugging a cable attached to the rotation module into/from a slot or a socket of a motherboard when rotatably installing or disassembling the rotation module.

2. Description of the Related Art

A host of a personal computer, desktop computer, network server or network data storage device usually bears a case-like design. In a housing or a case of the host, critical components including the motherboard, disk drive and hard drive are installed. In addition to loading an operating system and associated operation programs required, the hard drive further provides a data or file storage function.

Conventionally, a host is fixedly mounted onto a corresponding fixing frame in a host case by a number of screws and then electrically connected to the motherboard. In some cases, a user may need to replace or read from multiple different hard drives operated by the same host, or to disassemble a hard drive for repair. Thus, installation or disassembly processes based on the above arrangement is timing consuming and complicated.

With respect to the assembly of a hard drive, one conventional solution for solving the above problem is to provide a drawable structure that can be directly drawn from a host case. In such structure, a corresponding drawable frame is fixedly mounted to a fixing frame in the host case, and a hard drive is placed into a housing that can be extracted from the drawable frame in a way that the hard drive can be readily installed to or disassembled from the host case. While inserting the hard drive into the drawable frame, the transmission connection for power and signals can also be completed.

The extraction or insertion of the above drawable structure is conducted in a vertical manner at one side of the host case. However, not only such arrangement may not be suitable for all types of computer hosts, but the drawable frame may occupy a large part of the internal space of the host. Current techniques further provide a design that rotatably installs or disassembles a hard drive. That is, a hard drive can be placed in a rotation module, and be installed to or disassembled from a motherboard in a rotating manner.

FIGS. 1A and 1B show schematic diagrams of rotatably installing or disassembling a rotation module 100. More specifically, FIG. 1A shows a schematic diagram of the rotation module 100 mounted onto a motherboard 10, and FIG. 1B shows a planar view of the rotation module 100 mounted onto the motherboard 10. As shown in FIG. 1A, the rotation module 100 covers a part of the motherboard 10 when mounted onto the motherboard 10, and is installed to or disassembled from the motherboard 10 by rotating upward or downward relative to a plane where the motherboard 10 is located.

As shown in FIG. 1B, unlike the conventional drawable structure, the rotation module shown, after being installed, requires a cable 11 (including power and signal transmission) for connecting to or plugging into a corresponding slot 12 on the motherboard 10. A common slot or socket is designed at a rear end of hard drive, in a way that the slot 12 is concealed by the volume of the rotation module 100, and the plugging/unplugging can only be performed manually within a limited operating space. Further, with such rotation design, a boot failure may be resulted as a user may be prone to forget to plug in the cable 11 after completing the installation, or related components may be damaged as a user may forget to unplug the cable 11 and directly disassemble the rotation module 100.

Therefore, there is a need for a solution that conveniently connects or plugs/unplugs a cable when a user rotatably installs or disassembles a corresponding hard drive.

SUMMARY OF THE INVENTION

The invention is directed to a rotation module with a linked plugging and unplugging design. The rotation module is applied to a host case for installation or disassembly. During the installation or disassembly process, an attached cable can be simultaneously plugged into or unplugged from a slot or a socket of a motherboard.

A rotation module with a linked plugging and unplugging design is provided by the present invention. The rotation module is applied to a host case for installation and disassembly. The host case internally includes a motherboard. The rotation module includes: a housing, for accommodating a data storage unit electrically connected to a cable; a placement assembly, mounted on the host case, for guiding the housing along a first direction to install or disassemble the housing; a rotation assembly, for rotatably combining the housing and the placement assembly, and enabling the housing to be rotated relative to the motherboard along a second direction; and a linkage assembly, having one end disposed on a first side of the housing and a second end movably incorporated with the placement assembly, with a plug assembly of the cable assembled to the second end of the linkage assembly. In response to the housing rotated along the second direction, the second end of the linkage assembly is capable of moving in a linked manner along the first direction and enables the plug assembly to plug into or unplug from a slot of the motherboard.

According to the above concept, the rotation assembly includes a rotation screw, a rotation pin, a first rotation bracket disposed at one end of the first side and having a first rotation hole, and a second rotation bracket disposed at the other end of the first side and having a second rotation hole. The placement assembly includes a placing plate disposed on the host case, a third rotation bracket disposed at one end of the placing plate and having a third rotation hole, and a fourth rotation bracket disposed at the other end of the placing plate and having a rotation slot. The rotation screw is penetrated through the third rotation hole and the first rotation hole to be rotatably combined, and the rotation pin is penetrated through the second rotation hole and the rotation slot to be rotatably combined.

According to the above concept, the linkage assembly includes a first pivot bolt, a first pivot hole group disposed on the first side and forming the first end of the linkage assembly, a cable bracket forming the second end of the linkage assembly and having a second pivot hole group, and a connecting rod. The connecting rod includes a plate body, a first pole located at one end of the plate body and having a first opening and a first channel, and a second pole located at the other end of the plate body and having a second opening and a second channel. The first pivot bolt is penetrated through the first pivot hole group, the first opening and the first channel to be pivotally joined. The second pivot bolt is penetrated through the second pivot hole group, the second opening and the second channel to be pivotally joined.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
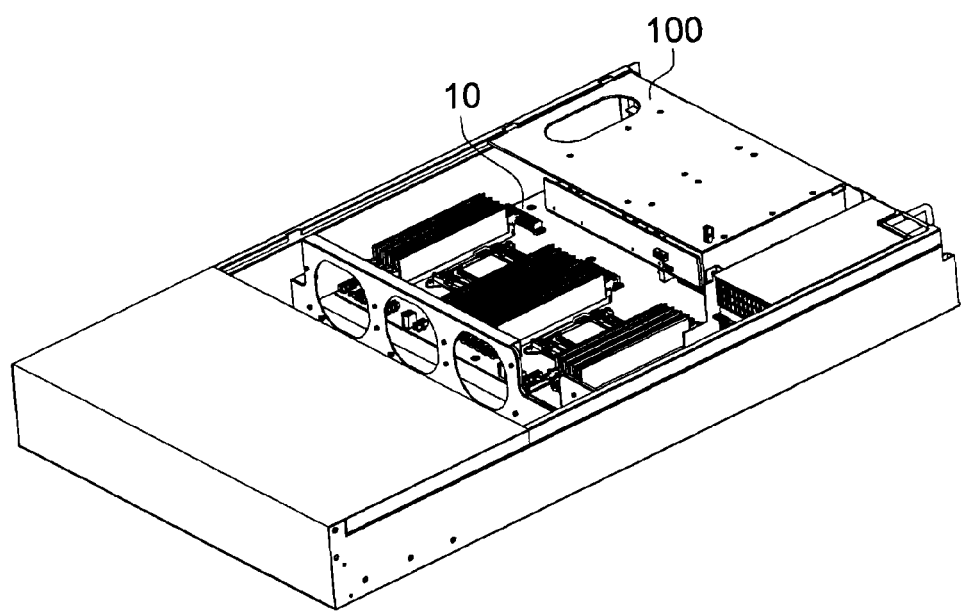
FIG. 1A is a schematic diagram of a rotation module 100 mounted on a motherboard 10.
Figure 1B:
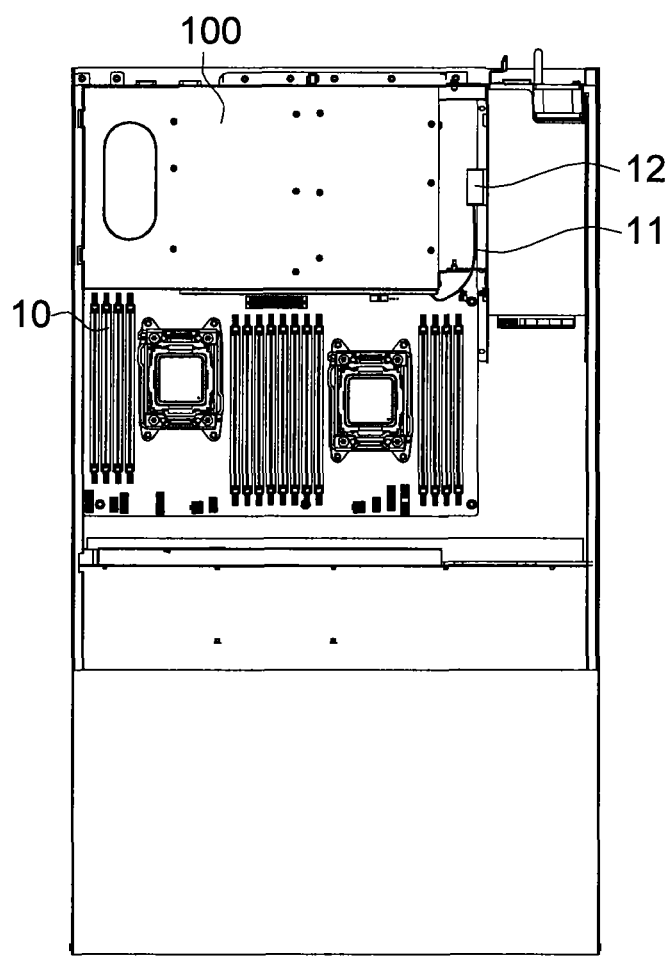
FIG. 1B is a planar view of the rotation module 100 mounted on the motherboard 10.
Figure 2A:
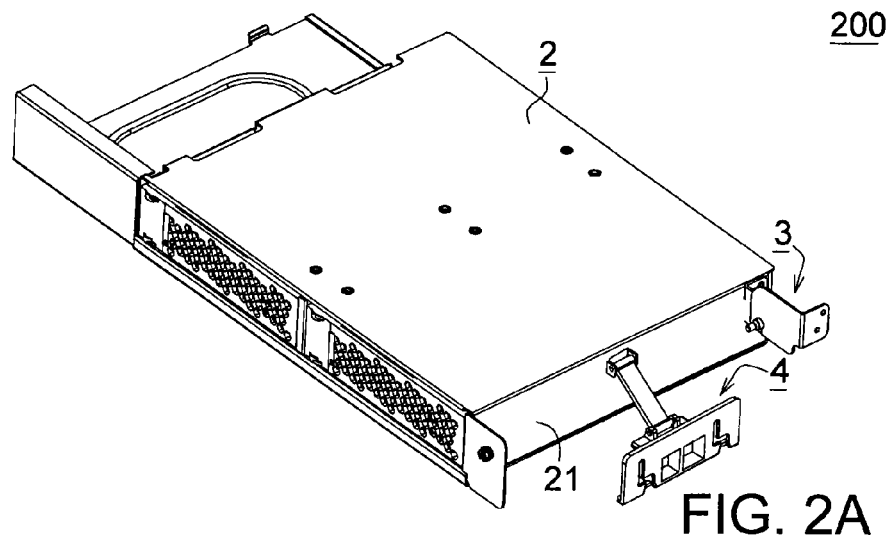
FIG. 2A is an assembly diagram of a part of the components of a rotation module 200 with a linked plugging and unplugging design according to an embodiment of the present invention.

A preferred embodiment of the present invention is described in detail below. FIG. 2A shows an assembly diagram of a part of the components of a rotation module 200 with a linked plugging and unplugging design of the present invention. Referring to FIG. 2A, the rotation module 200 includes a housing 2, a rotation assembly 3 and a linkage assembly 4. Connection relationships between the components or assemblies are also depicted in FIG. 2A. Similar to the prior art, the rotation module 200 of the present invention is applied to a host case for installation or disassembly in a rotating manner. The housing 2 is for accommodating a data storage unit, e.g., a hard drive or an optical disk drive. A main characteristic of the present invention is that, during the installation or disassembly process, the rotation module 200 is capable of simultaneously linked plugging/unplugging an attached cable into/from a slot or a socket of a motherboard. In the embodiment, the housing 2, the rotation module 3 and the linkage assembly 4 form a drawable structure.

Figure 2B:
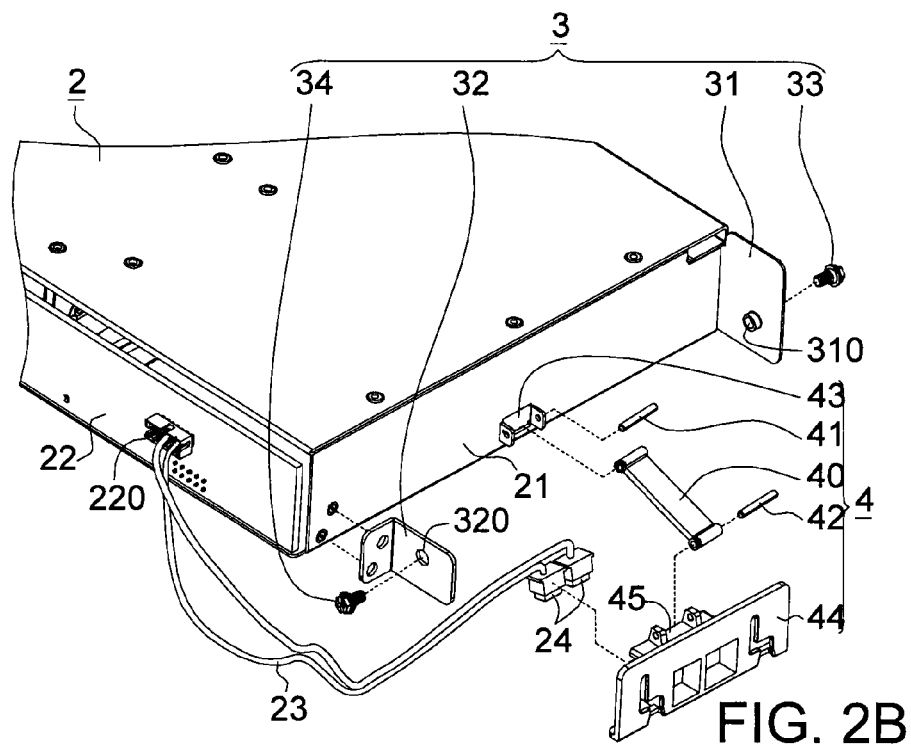
FIG. 2B is an exploded view of a part of the components of the rotation module 200.

FIG. 2B shows an exploded view of a part of the components of the rotation module 200, and presents the components in FIG. 2A by having rotated the components in FIG. 2A by 180 degrees. As shown in FIGS. 2A and 2B, the rotation assembly 3 includes a first rotation bracket 31, a second rotation bracket 32, a rotation screw 33 and a rotation pin 34. The linkage assembly 4 includes a connecting rod 40, a first pivot bolt 41, a second pivot bolt 42, a first pivot hole group 43 and a cable bracket 44. The linkage assembly 4 has one end (i.e., the first pivot hole group 43) disposed on a first side 21 of the housing 2. The data storage unit (not shown) accommodated in the housing 2 is electrically connected to a cable 23 that extends outward via a cable exit 220 at a second side 22 of the housing 2. The other end of the cable 23 forms a plug assembly 24.

The first rotation bracket 31 is disposed at one end of the first side 21, and the second rotation bracket 32 is disposed at the other end of the first side 21. In practice, the first rotation bracket 31 may be an extension of a side of the housing 2, i.e., the first rotation bracket 31 and the side of the housing 2 may be a formed integral. The second rotation bracket 32 is an L-shaped plate-like structure, and may be fastened onto the first side 21 by means of a screw or welded to the first side 21. The first rotation bracket 31 and the second rotation bracket 32 respectively include a first rotation hole 310 and a second rotation hole 320 for respectively assembling the rotation screw 33 and the rotation pin 34 to be correspondingly rotatably combined.

The first pivot hole group 43 is provided on the first side 21 and forms the first end of the linkage assembly 4. The cable bracket 44 forms a second end of the linkage assembly 4, and includes a second pivot hole group 45. In practice, the first pivot hole group 43 may be formed by two pivot holes, and apertures of the pivot holes and a distance between the pivot holes are designed to correspond to the connecting rod 40. Further, the first pivot hole group 43 may be a formed integral with the housing 2 on the first side 21, or as a component welded to the first side 21. Similarly, the second pivot hole group 45 is also formed by two pivot holes, with apertures of the pivot holes and a distance between these pivot holes being designed to correspond to the connecting rod 40.

Figure 3A:
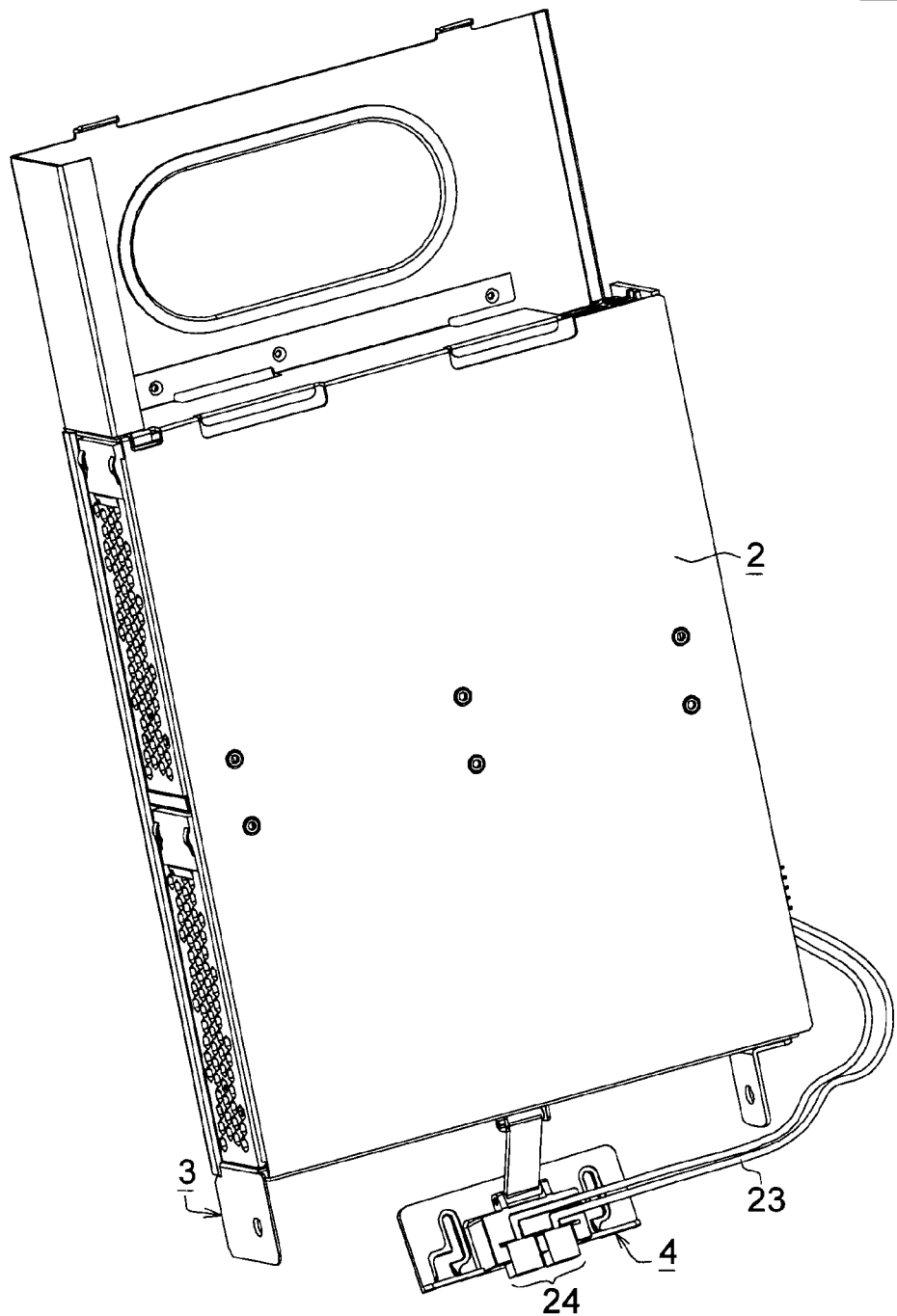
FIG. 3A is an assembly diagram of a part of the components of the rotation module 200.
Figure 3B:
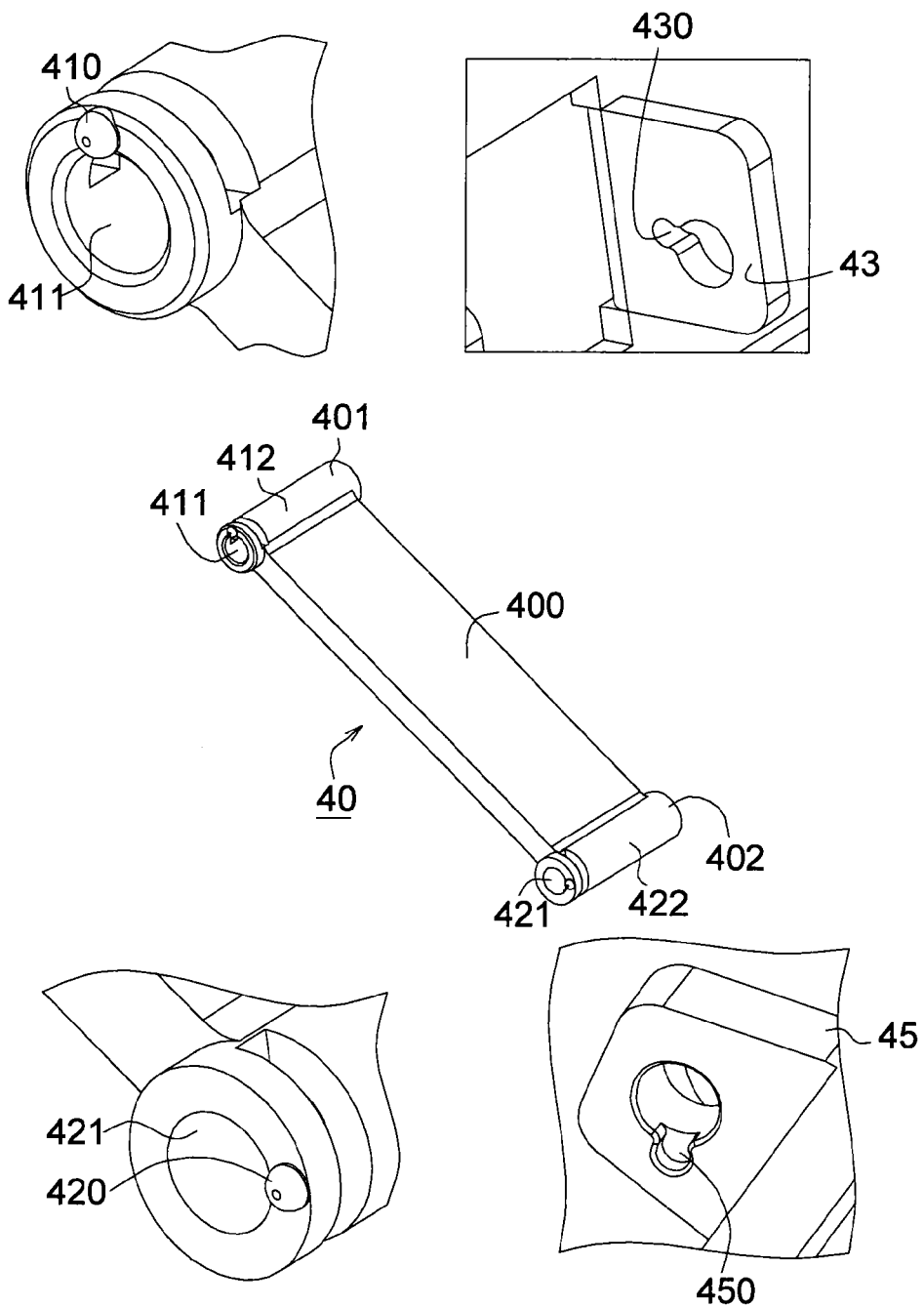
FIGS. 3B and 3C are partial enlarged views of a part of the components of a linkage assembly 4.
Figure 3C:
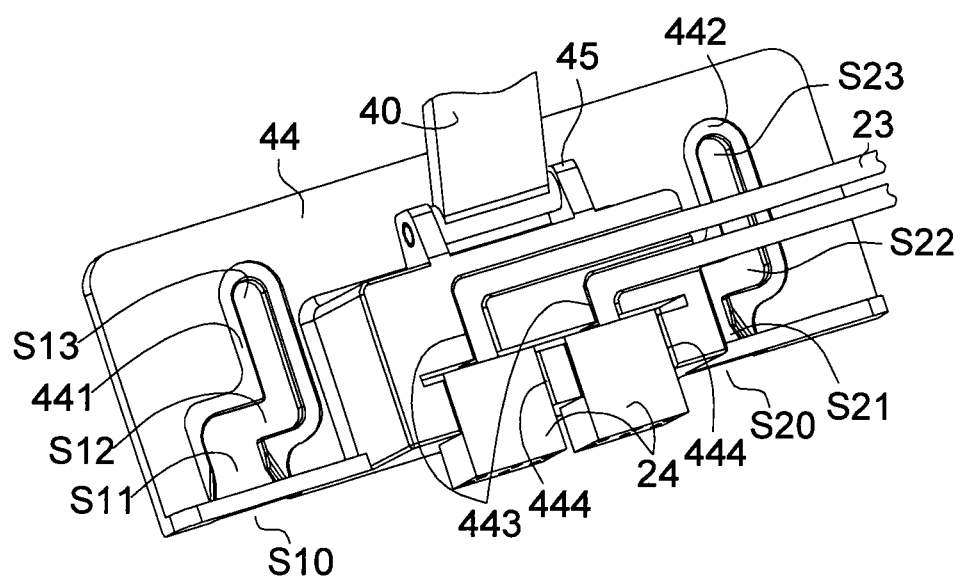

FIG. 3A shows an assembly diagram of a part of the components of the rotation module 200; FIG. 3B and FIG. 3C show partial enlarged views of a part of components of the linkage assembly 4. As shown in FIG. 3B, the connecting rod 40 includes a plate body 400, a first pole 401 and a second pole 402. The first pole 401 and the second pole 402 are respectively located at two ends of the plate body 400. The first pole 401 has a first opening 411 and a first channel 412, and the second pole 402 has a second opening 421 and a second channel 422. For assembly, the first pivot bolt 41 (referring to FIG. 2B) is penetrated through the first pivot hole group 43, the first opening 411 and the first channel 412 to be pivotally joined, and the second pivot bolt 42 (referring to FIG. 2B) is penetrated through the second pivot hole group 45, the second opening 421 and the second channel 422 to be pivotally joined, thereby rendering an assembly result as shown in FIG. 3A.

Further, as shown in FIG. 3B, the first opening 411 includes a first limiting bump 410 and the first pivot hole group 43 includes a corresponding first limiting dent 430. When the first pivot hole group 43 pivotally joins with the first opening 411, the first limiting bump 410 is correspondingly placed in the first limiting dent 430 and is restrained from free pivotal rotations. Similarly, the second opening 421 includes a second limiting bump 420 and the second pivot hole group 45 includes a corresponding second limiting dent 450. When the second pivot hole group 45 pivotally joins with the second opening 421, the second limiting bump 420 is correspondingly placed in the second limiting dent 450 and is restrained from free pivotal rotations. With the above design, the pivotal angle of the connecting rod 40 between the housing 2 and the cable bracket 44 can be limited, bounded or appropriately fixed to facilitate the subsequent assembly process.

In practice, the entire structure of the connecting rod 40 may be made by a hard material, with however a gap formed between the first opening 411 and the first channel 412 (or between the second opening 421 and second channel 422). As such, flexible deformation within a certain degree may be produced at the first opening 411 (or the second opening 421) by applying a force, such that the first limiting bump 410 becomes disengaged from the first limiting dent 430 (or the second limiting bump 420 becomes disengaged from the second limiting dent 450) to achieve the corresponding linked movement to be described shortly. From perspectives of initial assembly steps, the cable bracket 44 needs to be fixed at a predetermined angle according to corresponding positions of the bumps 410 and 420 and the dents 430 and 450. In the embodiment, the cable bracket 44 is arranged to be perpendicular to the first side 21.

The plug assembly 24 is assembled to the second end of the linkage assembly 4, i.e., to the cable bracket 44. More specifically, as shown in FIG. 3C, the cable bracket 44 includes a cable conduit group 443 and a socket group 444 (also referring to FIG. 2A). The cable conduit group 443 is for accommodating the cable 23, and the socket group 444 and the cable conduit group 443 are in communication with each other such that the plug assembly 24 formed at the other end of the cable 23 can be assembled to the socket group 444. In the embodiment, the cable 23 is designed to include two transmission lines (including power and signal transmission lines), and the plug assembly 24 includes two corresponding plugs. Thus, the cable conduit group 443 includes two conduits for respectively accommodating two transmission lines, and the socket group 444 includes two sockets for respectively accommodating the two plugs.

As shown in FIG. 3C, the cable bracket 44 further includes a first guiding track 441 and a second guiding track 442. Each of the tracks 441 and 442 includes a guiding entrance S10 (or S20), a first guiding section S11 (or S21), a second guiding section S12 (or S22) and a third guiding section S13 (or S23). The guiding sections are connected to one another in a step-like form. Functions of the guiding tracks 441 and 442 are to be described shortly.

Figure 4:
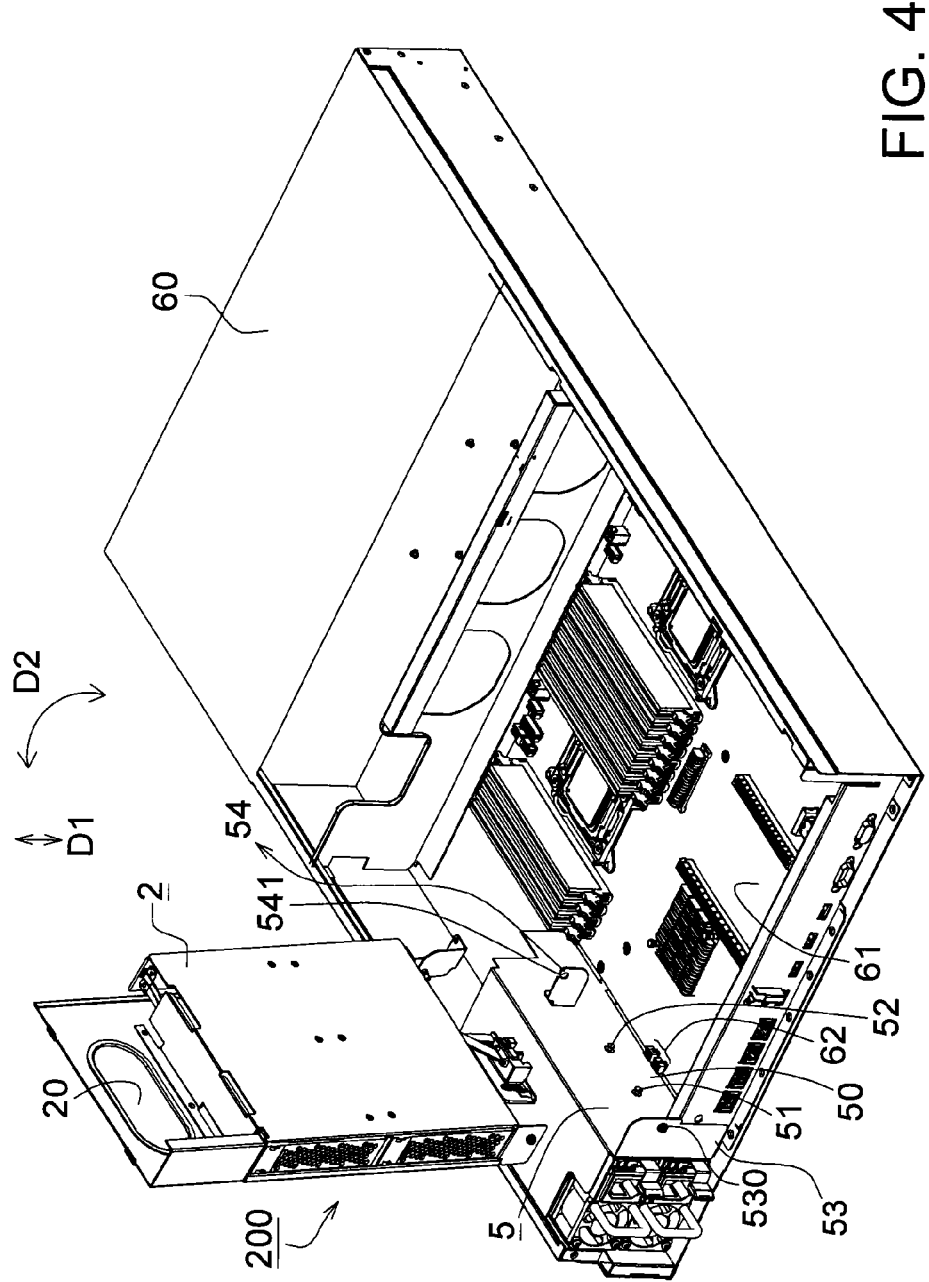
FIG. 4 is a schematic diagram showing a part of the components of the rotation module 200 being assembled to a host case 60.

FIG. 4 shows a schematic diagram of a part of the components (i.e., the drawable structure formed by the housing 2, the rotation assembly 3 and the linkage assembly 4) being assembled to a host case 60. The host case 60 internally includes a motherboard 61, which is relatively placed in horizontal on a lower surface in the host case 60. As shown in FIG. 4, on the host case 60, the rotation module 200 further includes a placement assembly 5 for guiding the housing 2 to install or disassemble the housing 2 along a first direction D1. In the embodiment, the first direction D1 is perpendicular to the motherboard 61, and the drawable structure formed by the housing 2, the rotation assembly 3 and the linkage assembly 4 is assembled to the placement assembly 5 along the first direction D1, i.e., in a direction perpendicular to the motherboard 61.

More specifically, the placement assembly 5 includes a placing plate 50, a third rotation bracket 53 and a fourth rotation bracket 54. On the host case 60, the placing plate 50 is disposed next to and perpendicular to the motherboard 61. The third rotation bracket 53 is disposed at one end of the placing plate 50, and the fourth rotation bracket 54 is disposed at the other end of the placing plate 50. In practice, the third rotation bracket 53 may be an L-shaped extension from a side of the placing plate 50, i.e., the third rotation bracket 53 and the placing plate 50 may be a formed integral. The fourth rotation bracket 54 may be a plate-like structure, an integral formed on the placing board 50, or as a component welded to the placing plate 50. The third rotation bracket 53 and the fourth rotation bracket 54 respectively include a third rotation hole 530 and a rotation slot 541 for respectively assembling the rotation screw 33 and the rotation pin 34 for rotated combining.

The placement assembly 5 further includes a first guiding post 51 and a second guiding post 52 disposed on the placing plate 50. The arranged positions of the first guiding post 51 and the second guiding post 52 and a distance between the two are designed to correspond to the first guiding track 441 and the second guiding track 442 of the cable bracket 44, i.e., to respectively guide the first guiding track 441 and the second guiding track 442 for assembly. Thus, in an assembly process along the first direction D1, the socket group 444 and the plug assembly 24 perpendicularly face a slot 62 on the motherboard 61. Through the rotation assembly 3, the housing 2 and the placement assembly 5 are rotatably combined, and the housing 2 is allowed to be rotated relative to the motherboard 61 along a second direction D2. Further, with the guiding tracks, the second end (i.e., the cable bracket 44) of the linkage assembly 4 is enabled to movably incorporate with the placement assembly 5.

It should be noted that, in the step shown in FIG. 4, the rotation pin 34 is already penetrated through the second rotation hole 320, with however the rotation screw 33 not yet penetrated through both of the third rotation hole 530 and the first rotation hole 310. The housing 2 further includes a handle 20, which allows a user to lift the entire drawable structure (formed by the housing 2, the rotation assembly 3 and the linkage assembly 4) to assemble the drawable structure to the host case 60.

Figure 5A:
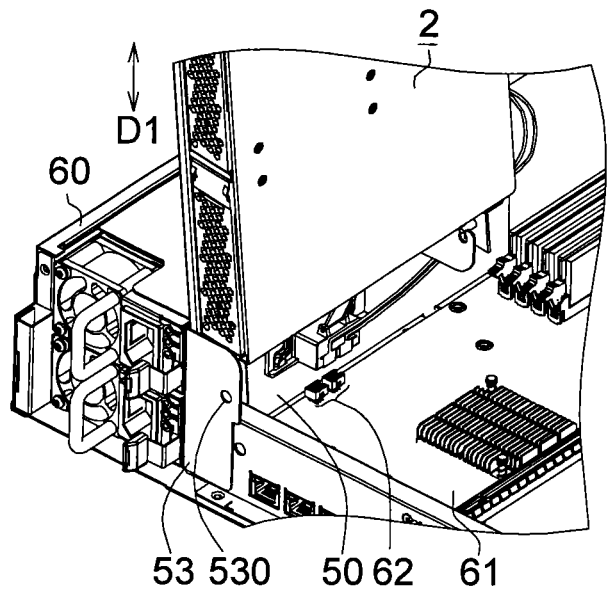
FIG. 5A is a schematic diagram of a drawable structure being assembled to a placement assembly 5.
Figure 5B:
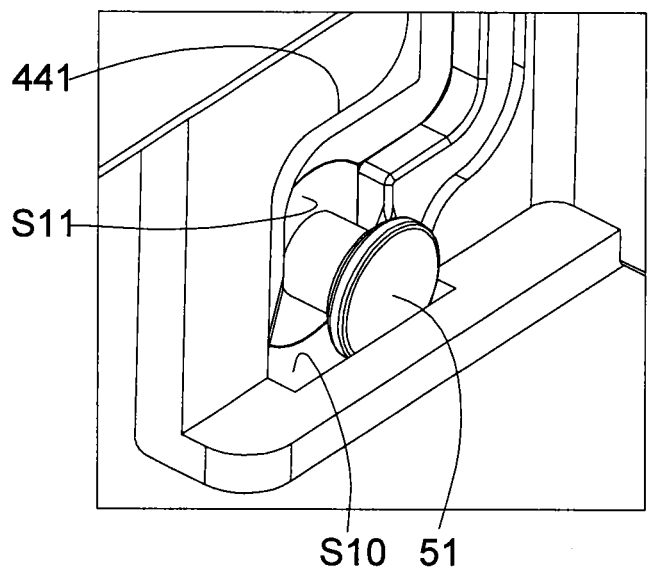
FIG. 5B is an enlarged assembly diagram of a first guiding post 51 and a first guiding track 441.
Figure 5C:
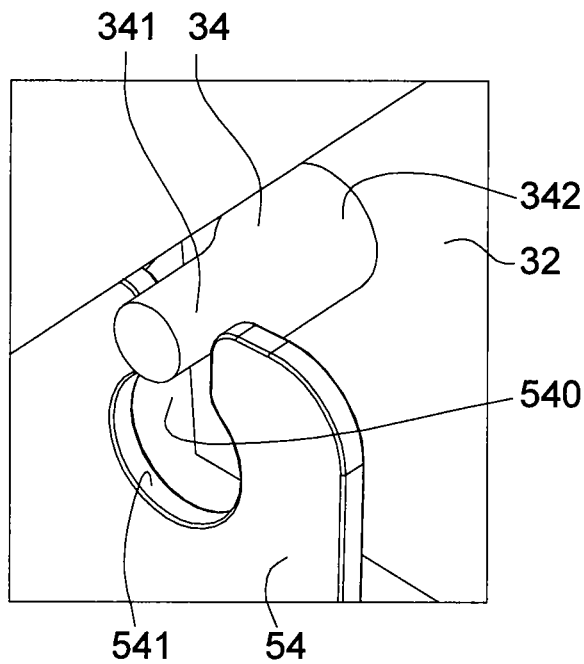
FIG. 5C is an enlarge assembly diagram of a rotation pin 34 and a rotation slot 541.

FIG. 5A shows a schematic diagram of the drawable structure being assembled to the placement assembly 5. FIG. 5B shows an enlarged assembly diagram of the first guiding post 51 and the first guiding track 441. FIG. 5C shows an enlarged assembly diagram of the rotation pin 34 and the rotation slot 541. Referring to FIGS. 5A to 5C, compared to FIG. 4, when the cable bracket 44 is guided by the placing plate 50 to continue moving downward, each guiding post 51 (or 52) is guided via the corresponding guiding entrance S10 (or S20) to the corresponding first guiding section S11 (or S21). In FIG. 5B, only the first guiding post 51 and the first guiding track 441 are depicted. In a design with mutually corresponding sizes and positions, the second guiding post 52 and the second guiding track 442 at the other side are in a similar form and are operated similarly.

Meanwhile, the rotation pin 34, which includes a first rotation section 341 and a second rotation section 342, has the first rotation section 341 located above a breach 540 of the rotation slot 541. As shown in FIG. 5C, the breach 540 of the rotation slot 541 faces a top part of the motherboard 61, and thus faces right toward the first rotation section 341 of the rotation pin 34 that is assembled downward.

In the embodiment, the first rotation section 341 and the second rotation section 342 of the rotation pin 34 are differently sized—the first rotation section 341 is narrower whereas the second rotation section 342 is thicker. More specifically, the diameter of the first rotation section 341 is smaller than the diameter of the second rotation section 342 and is smaller than the aperture of the breach 540, and the diameter of the second rotation section 342 is larger than the aperture of the breach 540 and is smaller than the diameter of the rotation slot 541. In other words, the first rotation section 341 is capable of passing through or disengaging from the breach 540, whereas the second rotation section 342 cannot pass through or is restrained from disengaging from the breach 540. Further, cross sections of the rotation slot 541 and the rotation sections 341 and 342 are circular, and so the second rotation section 342 can rotate within the rotation slot 541.

Figure 6A:
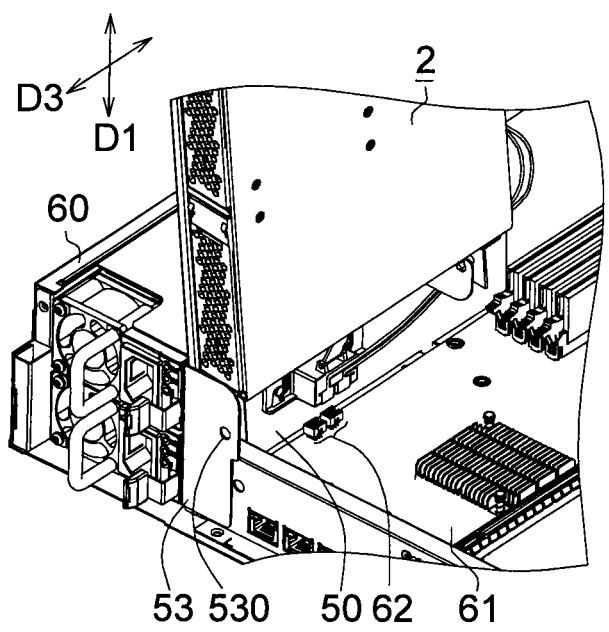
FIGS. 6A to 6C are assembly and associated enlarged diagrams in continuation of FIGS. 5A to 5C.
Figure 6B:
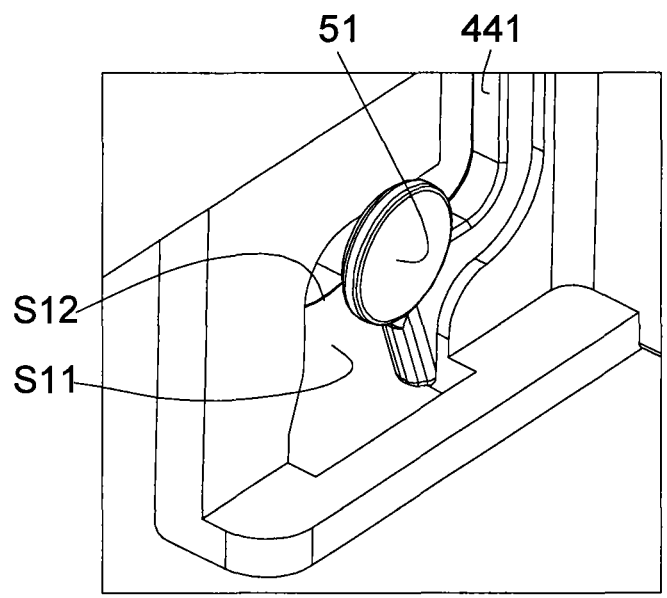
Figure 6C:
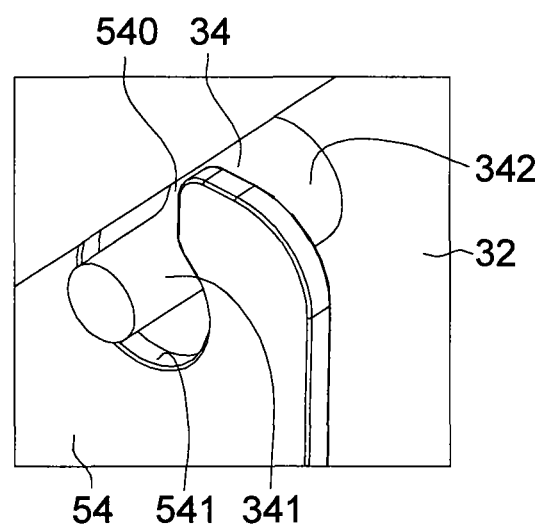

FIGS. 6A to 6C show assembly and associated enlarged schematic diagrams in continuation of FIGS. 5A to 5C. As shown in FIGS. 6A to 6C, compared to FIGS. 5A to 5C, when the cable bracket 44 is guided by the placing plate 50 to continue moving downward, each guiding post 51 (or 52) is located at a top part of the corresponding first guiding section S11 (or S21) and is then guided into the corresponding second guiding section S12 (or S22). In FIG. 6B, only the first guiding post 51 and the first guiding track 441 are depicted. In a design with mutually corresponding sizes and positions, the second guiding post 52 and the second guiding track 442 at the other side are in a similar form and are operated similarly.

Meanwhile, as shown in FIG. 6C, the first rotation section 341 having a smaller diameter enters the rotation slot 541 via the breach 540 of the rotation slot 541. Further, at this point, the first rotation section 341 is located at the center of the rotation slot 541.

Figure 7A:
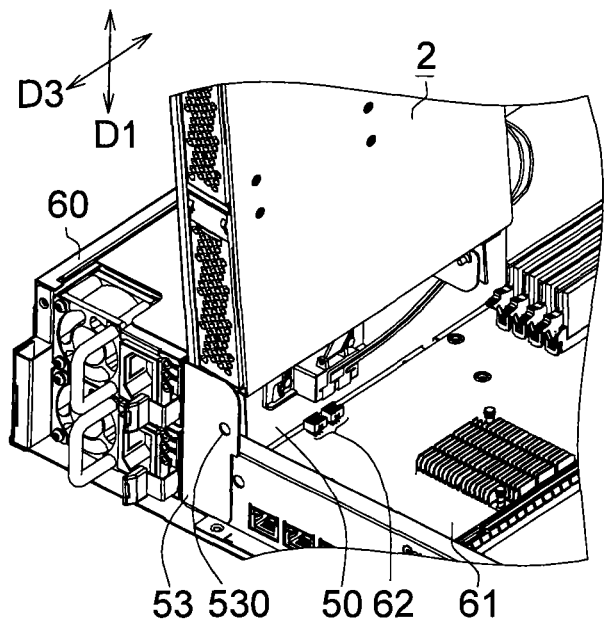
FIGS. 7A to 7C are assembly and associated enlarged diagrams in continuation of FIGS. 6A to 6C.
Figure 7B:
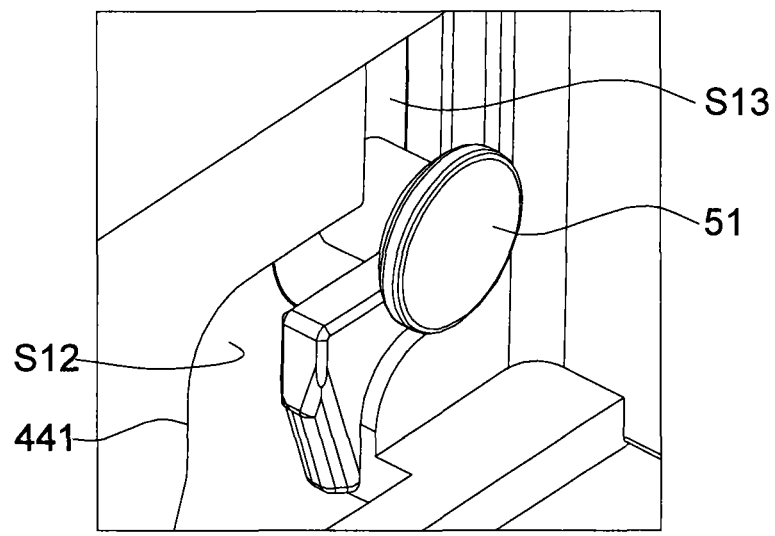
Figure 7C:
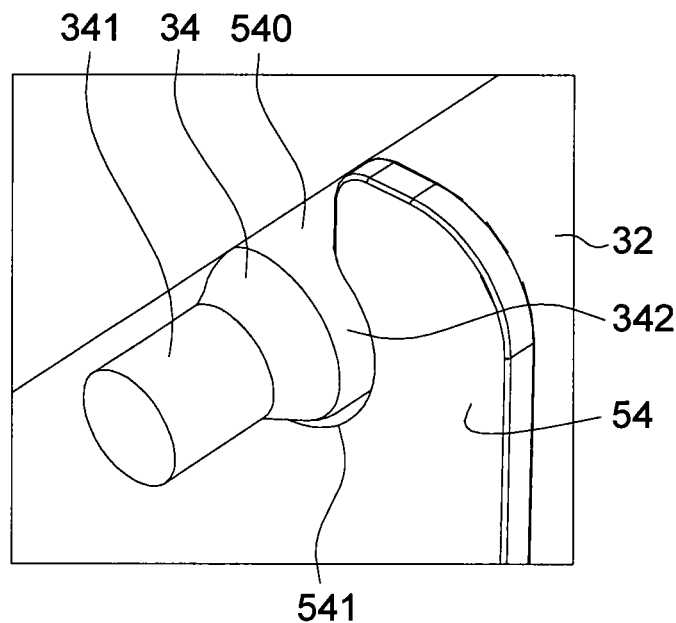

FIGS. 7A to 7C show assembly and associated enlarged schematic diagrams in continuation of FIGS. 6A to 6C. As shown in FIGS. 7A to 7C, compared to FIGS. 6A to 6C, the drawable structure (formed by the housing 2, the rotation assembly 3 and the linkage assembly 4) is capable of moving along a third direction D3, enabling the rotation pin 34 to correspondingly move within the rotation slot 541 and changing the relative position of each guiding post 51 (or 52) in the corresponding second guiding section S12 (or S22). Similarly, in FIG. 7B, only the first guiding post 51 and the first guiding track 441 are depicted. In a design with mutually corresponding sizes and positions, the second guiding post 52 and the second guiding track 442 at the other side have a similar form and are operated similarly.

In the embodiment, based on the illustration of FIG. 6A and FIG. 7A, the drawable structure moves along the third direction D3 by a small distance toward the third rotation bracket 53. The third direction D3 is perpendicular to the first direction D1 and is parallel to the placing plate 50. Meanwhile, as shown in FIG. 7B, the first guiding post 51 is relatively located at a side of the second guiding section S12 and is guided into the third guiding section S13. The second guiding post 52 at the other side has a similar form and is operated similarly. As shown in FIG. 7C, the second rotation section 342 thus enters the rotation slot 541. Further, at this point, the second rotation section 342 is located at the center of the rotation slot 541. As the second rotation section 342 is thicker, the second rotation section 342 is restrained from disengaging from the breach 540, i.e., the housing 2 is prohibited from moving up and down.

Figure 8A:
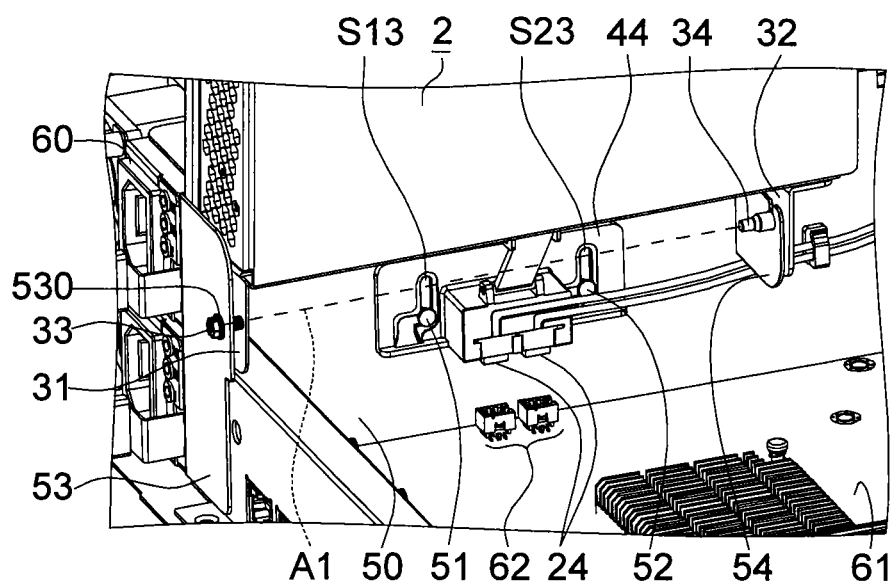
FIG. 8A is an partial enlarged view of the rotation module 200 having been installed to the host case 60.
Figure 8B:
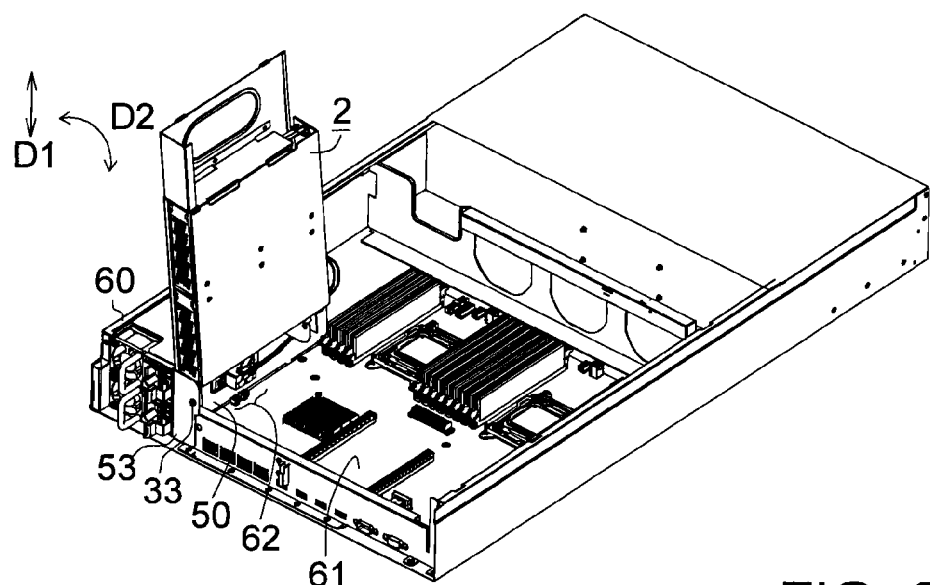
FIG. 8B is a schematic diagram of the rotation module 200 having been installed to the host case 60.

FIGS. 8A and 8B show an partial enlarged view and an overall schematic diagram when the rotation module 200 is assembled to the host case 60. In continuation to the step in FIG. 7A, at this point, the first rotation bracket 31 has moved near the third rotation bracket 53, and the positions and heights of the third rotation hole 530 and the first rotation hole 310 correspond to one another. As such, from an outer side, the rotation screw 33 is sequentially penetrated through the third rotation hole 530 and the first rotation hole 310 to be rotatably combined to present a complete assembly shown in FIGS. 8A and 8B. In this embodiment, the rotation screw 33 is designed with a circular section, which is located between the third rotation hole 530 and the first rotation hole 310 in the rotated combining, in a way that the rotation screw 33 may serve as a rotation axis. Further, from the outer side, the rotation pin 34 may also be sequentially penetrated through the second rotation hole 320 and the rotation slot 541 to be rotatably combined. With corresponding positions and heights, the rotation screw 33 and the rotation pin 34 are capable of coaxial rotations along an axial line A1, so that the housing 2 can be rotated relative to the motherboard 61 along the second direction D2.

Being inwardly fixed by the rotation screw 33, the housing 2 is prohibited from up and down movements as well as left and right movements. At this point, as shown in FIG. 8A, in addition to the cable bracket 44 being perpendicular to the motherboard 61, the plug assembly 24 on the cable bracket 44 also faces the slot 62 on the motherboard 61, and the guiding posts 51 and 52 are respectively located at the side ends of the second guiding sections S12 and S22 or located at the lower ends of the third guiding sections S13 and S23. Further, in the completed assembly shown in FIG. 8B, the housing 2 of the rotation module 200 is flipped to open upward in a way that a user can readily repair the motherboard 61. For example, the user may replace or remove related electronic components or device interface cards.

Figure 8C:
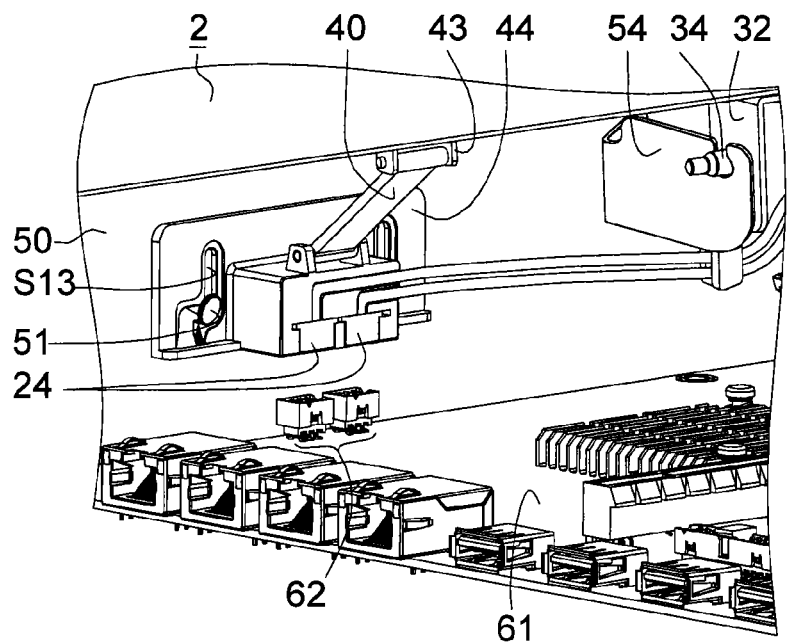
FIG. 8C is an partial enlarged view of the rotation module 200 having been installed to the host case 60 from another angle.
Figure 8D:
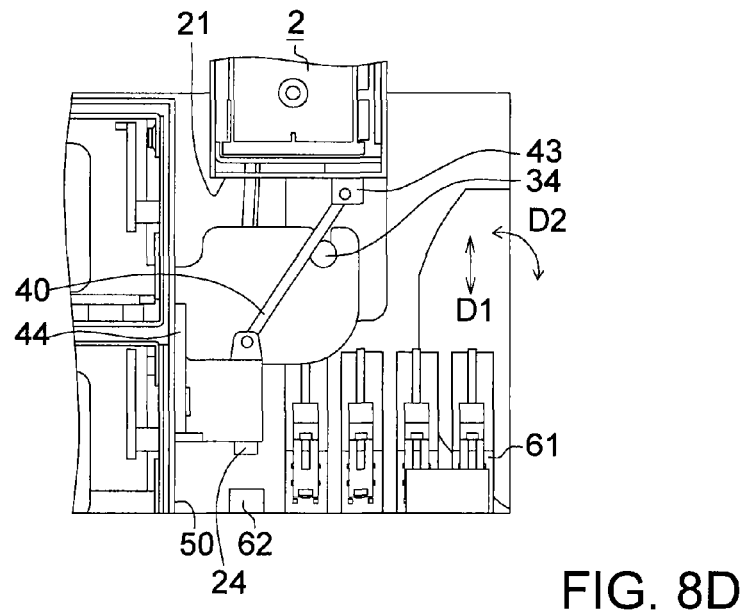
FIG. 8D is a sectional view of FIG. 8C.

FIG. 8C shows an partial enlarged view from another angle when the rotation module 200 is assembled to the host case 60. FIG. 8D is a sectional view of FIG. 8C. Implementation details of FIGS. 8C and 8D are the same as those of FIGS. 8A and 8B. Referring to FIGS. 8C and 8D, the plug assembly 24 is not yet inserted into the slot 62, and is kept at a distance from the slot 62. Under such conditions, the housing 2 is perpendicular to the motherboard 61; that is, the first and second limiting bumps 410 and 420 in FIG. 3B are respectively placed in the first and second limiting dents 430 and 450. As shown in FIG. 8D, an included angle of approximately 60 degrees is present between the first side 21 where the first end (i.e., the first pivot hole group 43) of the linkage assembly 4 is located and the connecting rod 40.

Figure 9A:
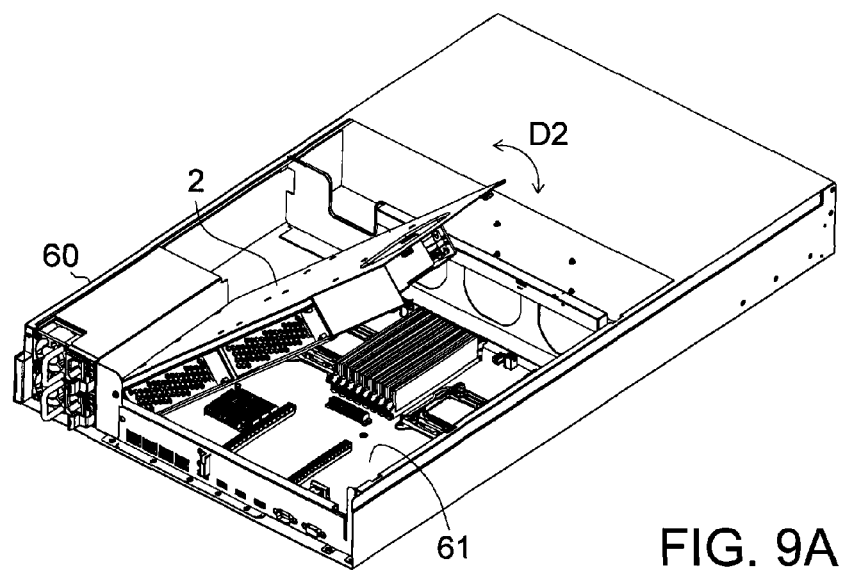
FIG. 9A is a schematic diagram of a housing 2 of the rotation module 200 being rotated.
Figure 9B:
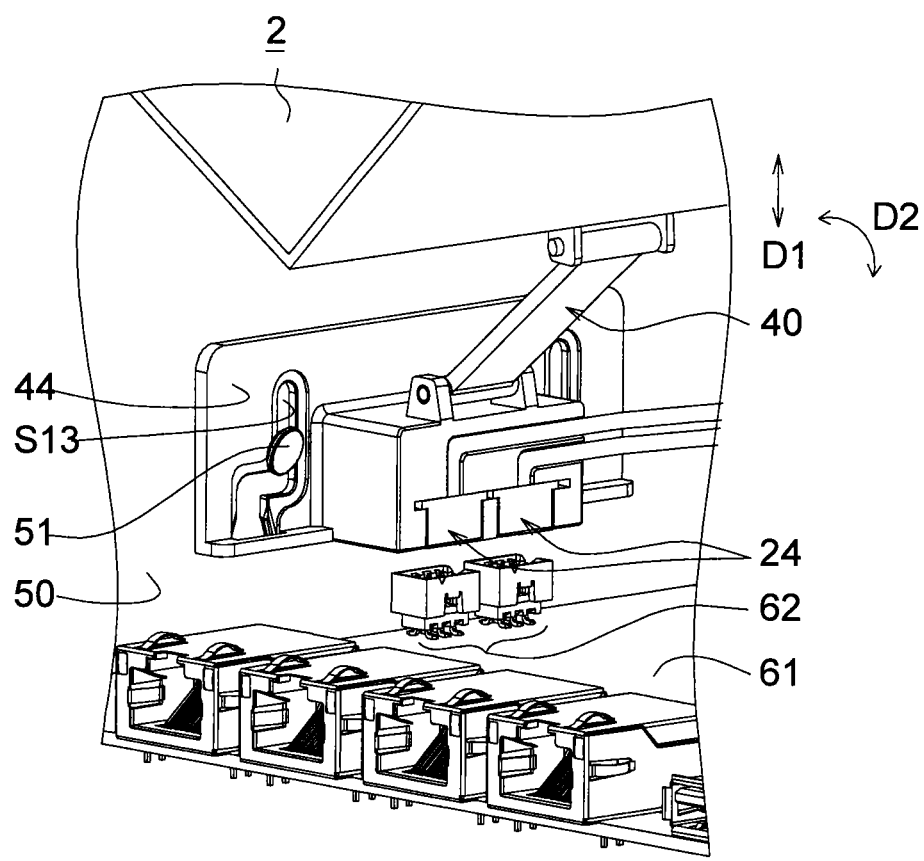
FIG. 9B is an partial enlarged view of the housing 2 of the rotation module 200 being rotated.

FIGS. 9A and 9B show a schematic diagram and an partial enlarged view of the housing 2 of the rotation module 200 being rotated. As shown in FIG. 9A, the housing 2 is rotated toward the motherboard 61 along the second direction D2. That is, the housing 2 is rotated within an angle range between being perpendicular to the motherboard 61 and being parallel to the motherboard 61. As shown in FIG. 9B, when the housing 2 is rotated to such angle, in response to the housing 2 rotated along the second direction D2, the second end (i.e., the cable bracket 44) of the linkage assembly 4 is correspondingly moved in a linked manner along the first direction D1. That is, the cable bracket 44 moves along the placing plate 50, such that the relative position of each guiding post 51 (or 52) in the corresponding third guiding section S13 (or 23) is changed.

Figure 10A:
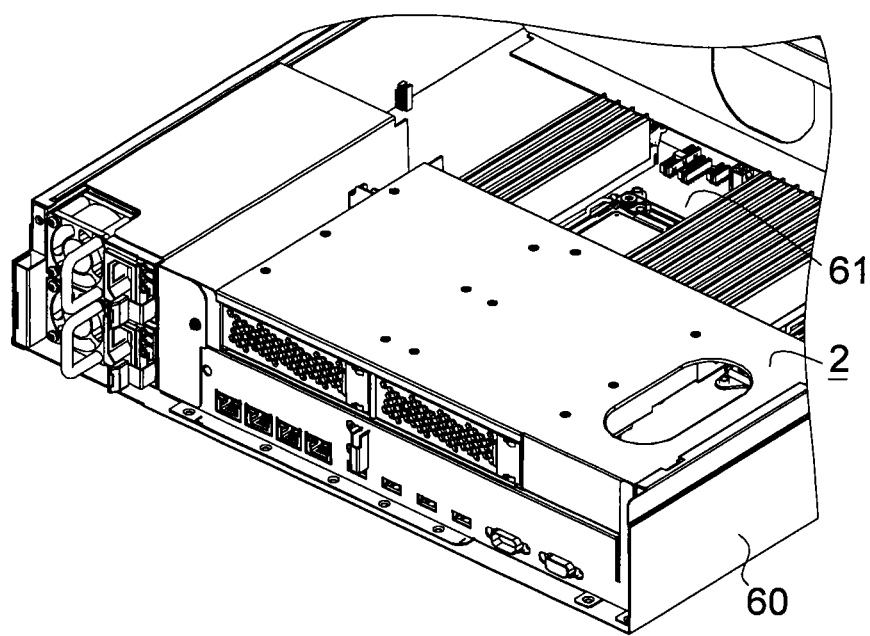
FIG. 10A is a schematic diagram of the housing 2 of the rotation module 200 having been rotated to a predetermined fixed position.
Figure 10B:
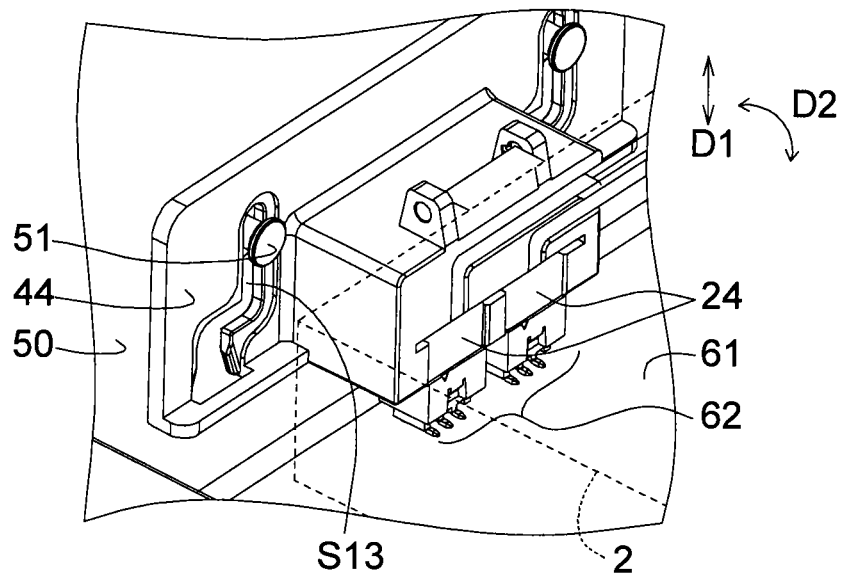
FIG. 10B is an partial enlarged view of the housing 2 of the rotation module 200 having been rotated to a predetermined fixed position from another angle.
Figure 10C:
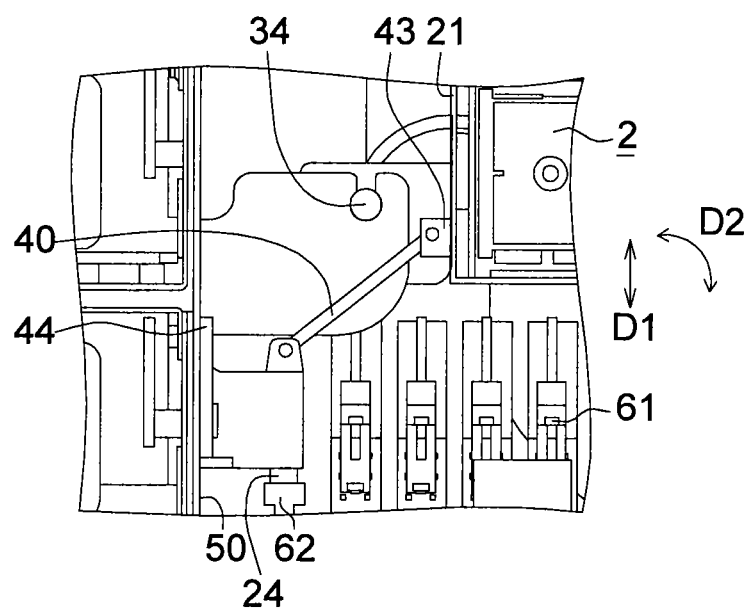
FIG. 10C is a sectional view of FIG. 10B.

FIG. 10A shows a schematic diagram of the housing 2 of the rotation module 200 rotated to a predetermined fixed position. FIG. 10B shows an partial enlarged view from another angle when of the housing 2 of the rotation module 200 is rotated to a predetermined fixed position. FIG. 10C shows a sectional view of FIG. 10B. As shown in FIG. 10A, the housing 2 is rotated to an angle parallel to the motherboard 61, and covers a part of the motherboard 61 and is appended on the host case 60 due to the corresponding sizes of the housing 2 and the host case 60. As shown in FIG. 10B, when the housing 2 is rotated to such angle, the plug assembly 24 is plugged into the slot 62 and the cable bracket 44 moves downward due to the linked movement, such that each guiding post 51 (or 52) is located at the top end of the corresponding third guiding section S13 (or S23).

As shown in FIG. 10O, an included angle of approximately 120 degrees is present between the first side 21 where the first end (i.e., the first pivot hole group 43) of the linkage assembly 4 is located and the connecting rod 40, and the first side 21 appears to be perpendicular to the motherboard 61. That is to say, in response to the force generated from rotating the housing 2, the first limiting bump 410 becomes disengaged from the first limiting dent 430, and the connecting rod 40 is pivotally rotated to propel the cable bracket 44 downward in a linked movement.

Again referring to FIGS. 8D and 10C, the housing 2 is rotated with respect to the coaxial center formed by the rotation screw 33 and the rotation pin 34, and the first end (i.e., the first pivot hole group 43) of the linkage assembly 4 and the first side 21 are also rotated along the same tracks. Further, with the connecting rod 40 that is entirely made of a hard material (i.e., the plate body 400 is free from deformation) and the design of corresponding sizes, the connecting rod 40 pushes the cable bracket 44 in a slanted direction as the position of the connecting rod 40 changes. In addition, since the cable bracket 44 is restrained by the guiding posts 51 and 52, the slanted downward thrust can be transformed into a vertical and downward thrust along the placing plate 50 to move the cable bracket 44 downward to approach the motherboard 61, so that the plug assembly 24 is exactly plugged into the slot 62 to complete electrical installation.

In the embodiment, details of electrical connection and installation are given based on assembling the rotation module 200 to the host case 60 and plugging the plug assembly 24 into the slot 62. In contrast, to unplug the plug assembly 24 from the slot 62 and disassemble the rotation module 200 from the host case 60, the abovementioned steps are performed in reverse. For example, the housing 2 is rotated towards a direction away from the motherboard 61, i.e., the housing 2 can be flipped open from the host case 60. The connecting rod 40, due to its change in position, pulls the cable bracket 44 in a slant direction. The cable bracket 44 transforms the slanted upward pulling force into a vertically upward pulling force along the placing plate 50 to move upward and away from the motherboard 61, such that the plug assembly 24 becomes disengaged from the slot 62 to cut off the electrical connection.

Various modifications can be made based on the concept disclosed by the preferred embodiment above to achieve similar effects and functions using a similar structure. For example, in the above preferred embodiment, the housing and the cable bracket are assembled along a direction perpendicular to the motherboard. As the plug assembly needs to be perpendicularly plugged into the slot, the cable bracket needs to be perpendicular to the motherboard whereas the housing is not required to be so. That is, in the beginning step of the assembly process (e.g., the step in FIG. 4), the positions of the first limiting bump and the first limiting dent can be altered, in a way that the housing displays an angle (e.g., 60 degrees) instead of being perpendicular to the motherboard. It should be noted that, the length of the connecting rod then needs to be designed with a corresponding value.

Alternatively, the rotation pin of the rotation assembly may be replaced by a rotation screw, and the fourth rotation bracket is provided with a common rotation hole instead of a rotation slot. Meanwhile, the guiding sections of the two guiding tracks may be designed as straight lines that interconnect one another rather than the step-like form. That is, the housing may be directly assembled perpendicularly to the motherboard without involving third-direction movements.

In conclusion, the rotation module with a linked plugging and unplugging design of the present invention is capable of automatically plugging/unplugging a cable into/from a slot or a socket during a rotation process. That is, since manual plugging/unplugging performed by a user within a limited operation space is uninvolved, issues of a boot failure caused by forgetting to plug in the cable after installation and damages caused by forgetting to unplug the cable and directly disassembling are eliminated, thereby solving issues of the prior art and achieving the object of the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rotation module with a linked plugging and unplugging design, applied to a host case for installation or disassembly, the host case internally comprising a motherboard; the rotation module comprising:
   a housing, for accommodating a data storage unit, the data storage unit electrically connected to a cable;
   a placement assembly, mounted on the host case, for guiding the housing along a first direction to install or disassemble the housing;
   a rotation assembly, for rotatably combining the housing and the placement assembly, and enabling the housing to be rotated relative to the motherboard and along a second direction; and
   a linkage assembly, having a first end disposed on a first side of the housing and a second end movably incorporated with the placement assembly, with a plug assembly of the cable assembled to the second end of the linkage assembly;
   wherein, in response to the housing rotated along the second direction, the second end of the linkage assembly correspondingly performs a linked movement along the first direction, and renders the plug assembly to plug into or unplug from a slot on the motherboard.

2. The rotation module according to claim 1, wherein the data storage unit is a hard drive or an optical disk drive.

3. The rotation module according to claim 1, wherein the rotation assembly comprises:
   a rotation screw;
   a rotation pin;
   a first rotation bracket, disposed at one end of the first side, comprising a first rotation hole; and a second rotation bracket, disposed at one other end of the first side, comprising a second rotation hole; and the placement assembly comprises:

a placing plate, disposed on the host case;

a third rotation bracket, disposed at one end of the placing plate, comprising a third rotation hole; and a fourth rotation bracket, disposed at one other end of the placing plate, comprising a rotation slot;

wherein, the rotation screw is penetrated through the third rotation hole and the first rotation hole to be rotatably combined, and the rotation pin is penetrated through the second rotation hole and the rotation slot to be rotatably combined.

4. The rotation module according to claim 3, wherein the rotation screw and the rotation pin form coaxial rotation, and when the housing is rotated along the second direction and renders the first side to be perpendicular to the motherboard, the plug assembly is plugged into the slot.

5. The rotation module according to claim 3, wherein the placing plate is neighboring to and perpendicular to the motherboard, and the first direction is perpendicular to the motherboard.

6. The rotation module according to claim 3, wherein the rotation pin comprises a first rotation section and a second rotation section, the rotation slot comprises a breach, a diameter of the first rotation section is smaller than a diameter of the second rotation section and smaller than an aperture of the breach, the diameter of the second rotation section is larger than the aperture of the breach and smaller than a diameter of the rotation slot.

7. The rotation module according to claim 6, wherein the housing is capable of moving along a third direction, and enables the rotation pin to correspondingly move in the rotation slot and to disengage from or restrain from disengaging from the breach of the rotation slot.

8. The rotation module according to claim 1, wherein the linkage assembly comprises:

a first pivot bolt;

a second pivot bolt;

a first pivot hole group, disposed on the first side and forming the first end of the linkage assembly;

a cable bracket, forming the second end of the linkage assembly, comprising a second pivot hole group; and a connecting rod, comprising:

a plate body;

a first pole, located at one end of the plate body, comprising a first opening and a first channel; and a second pole, located at one other end of the plate body, comprising a second opening and a second channel;

wherein, the first pivot bolt is penetrated through the first pivot hole group, the first opening and the first channel to be pivotally joined, and the second pivot bolt is penetrated through the second pivot hole group, the second opening and the second channel to be pivotally joined.

9. The rotation module according to claim 8, wherein the cable bracket is perpendicular to the motherboard.

10. The rotation module according to claim 8, wherein the first opening has a first limiting bump and the first pivot hole group has a first limiting dent; when the first pivot hole group and the first opening are pivotally joined, the first limiting bump is placed in the first limiting dent to limit a pivotal angle, and the first limiting bump becomes disengaged from the first limiting dent by applying a force.

11. The rotation module according to claim 8, wherein the second opening has a second limiting bump and the second pivot hole group has a second limiting dent; when the second pivot hole group and the second opening are pivotally joined, the second limiting bump is placed in the second limiting dent to limit a pivotal angle, and the second limiting bump becomes disengaged from the second limiting dent by applying a force.

12. The rotation module according to claim 8, wherein the cable bracket comprises:

a cable conduit group, for accommodating a part of the cable; and a socket group, connected to the cable conduit group and facing the motherboard, for accommodating the plug assembly.

13. The rotation module according to claim 8, wherein the cable bracket comprises a first guiding track and a second guiding track, the placement assembly comprises a placing plate, a first guiding post and a second guiding post, and the first guiding post and the second guiding post are disposed on the placing plate and are for respectively guiding the first guiding track and the second guiding track.

14. The rotation module according to claim 13, wherein the first and second guiding tracks respectively comprise a guiding entrance, a first guiding section, a second guiding section and a third guiding section; the first and second guiding posts are respectively guided via the corresponding guiding entrances to the corresponding first guiding sections; in response to the housing moving along a third direction, relative positions of the first and second guiding posts in the corresponding second guiding sections are changed; and, in response to the cable bracket moved in a linked manner along the first direction, relative positions of the first and second guiding posts in the corresponding third guiding sections are changed.

* * * * *